US012728529B2

(12) United States Patent
K.M.

(10) Patent No.: US 12,728,529 B2
(45) Date of Patent: Sep. 8, 2026

(54) METHOD AND SYSTEM FOR CONTROLLING MULTIPLE ROBOTS

(71) Applicant: ABB Schweiz AG, Baden (CH)

(72) Inventor: Prasad K.M., Bangalore (IN)

(73) Assignee: ABB Schweiz AG, Baden (CH)

( * ) Notice: Subject to any disclaimer, the term of this patent is extended or adjusted under 35 U.S.C. 154(b) by 99 days.

(21) Appl. No.: 18/784,443

(22) Filed: Jul. 25, 2024

(65) Prior Publication Data

US 2024/0375278 A1 Nov. 14, 2024

Related U.S. Application Data

(63) Continuation of application No. PCT/IB2022/050622, filed on Jan. 25, 2022.

(51) Int. Cl.
*B25J 9/16* (2006.01)
*G05B 19/409* (2006.01)

(52) U.S. Cl.
CPC ........... *B25J 9/1656* (2013.01); *B25J 9/1602* (2013.01); *G05B 19/409* (2013.01); *G05B 2219/39448* (2013.01)

(58) Field of Classification Search
CPC ..... B25J 9/1656; B25J 9/1602; G05B 19/409; G05B 2219/39448
See application file for complete search history.

(56) References Cited

U.S. PATENT DOCUMENTS

| | | | | |
|---|---|---|---|---|
| 5,991,510 | A | 11/1999 | Beaulieu | |
| 2001/0035729 | A1 | 11/2001 | Graiger et al. | |
| 2009/0299524 | A1* | 12/2009 | Evans | B25J 9/1656 700/248 |
| 2014/0015673 | A1* | 1/2014 | Soffer | G06F 13/4068 340/568.1 |
| 2017/0113343 | A1* | 4/2017 | Inaba | B25J 9/161 |
| 2020/0338740 | A1 | 10/2020 | Kobayashi | |

FOREIGN PATENT DOCUMENTS

WO WO 02/078913 A1 10/2002

OTHER PUBLICATIONS

WO02078913 NPL (Year: 2002).*
European Patent Office, International Search Report in International Patent Application No. PCT/IB2022/050622, 4 pp. (Sep. 19, 2022).
European Patent Office, Written Opinion in International Patent Application No. PCT/IB2022/050622, 7 pp. (Sep. 19, 2022).

* cited by examiner

*Primary Examiner* — Mohamad O El Sayah
(74) *Attorney, Agent, or Firm* — Fitch Even Tabin & Flannery LLP

(57) ABSTRACT

A system and method for controlling multiple robots using a single HMI device includes having a Teach Pendant Unit Multiplexer (TPU-MUX) that allows multiple robots to remain connected to the single HMI device all at the same time. The system further allows the HMI device to communicate with at least one robot among the plurality of connected robots, at a time and to switch between a plurality of connected robots seamlessly.

13 Claims, 7 Drawing Sheets

METHOD AND SYSTEM FOR CONTROLLING MULTIPLE ROBOTS

CROSS-REFERENCE TO RELATED APPLICATIONS

The instant application claims priority to International Patent Application No. PCT/IB2022/050622, filed Jan. 25, 2022, which is incorporated herein in its entirety by reference.

FIELD OF THE DISCLOSURE

The present disclosure in general relates to control mechanism for multiple robots. More particularly, but not exclusively, to method and system for controlling multiple robots using a single Human Machine Interface (HMI).

BACKGROUND OF THE INVENTION

Teach Pendant, which may also be commonly referred as Human Machine Interface (HMI) or Flex Pendant, is a device used to control the functionalities of a robot. Precisely, to control the functionalities of a robot, one HMI device is connected through hard wires to one robot via its corresponding controller. The HMI device is then used to give commands/signals to the connected controller to perform the desired functionalities, by the corresponding robot.

The aforementioned arrangement suits well in an environment where only single robot is to be controlled through a single HMI device. However, in an industrial set-up, where multiple robots are required to perform a task, there are two possible configurations: (1) having a dedicated HMI device for each robot i.e., having multiple HMI devices for controlling multiple robots connected in 1:1 configuration; (2) having a single HMI device for multiple robots, wherein the HMI device is used to operate one robot at a time. In later configuration, the HMI device needs to be disconnected from the actively connected robot and needs to be connected to one of the other desired robots.

Those skilled in the art will appreciate that both the above discussed configurations have their own limitations. For example, having multiple HMI devices connected to multiple robots leads to numerous challenges such as one needs to buy multiple HMI devices which increases the overall cost of operations. Secondly, it increases the overall complexity of the setup and reduces the efficiency of the operator as well as overall operations. Whereas, when a single HMI device is used for connecting to multiple robots, one at a time. The process of manually disconnecting and connecting to different robots as per operator requirement not only leads to operator inconvenience but also reduces the overall efficiency of the process.

BRIEF SUMMARY OF THE INVENTION

Based on the foregoing, there exists a need for further improvements in the technology, especially for a system that allows multiple robots to remain connected and controlled through a single HMI device where the operator is not required to manually disconnect and connect the HMI device to different available robots. Also, there exists a need for improvement in HMI device that not only allows multiple robots to remain connected but also allows the operator to operate any of the plurality of connected robots by simple, effective and user-friendly user interface (UI).

One or more shortcomings discussed above are overcome, and additional advantages are provided by the present disclosure. Additional features and advantages are realized through the techniques of the present disclosure. Other embodiments and aspects of the disclosure are described in detail herein and are considered a part of the disclosure.

In one aspect, the present disclosure provides a system that may control multiple robots using a single HMI device. The present disclosure also provides an HMI device with interactive User Interface (UI) that not only allows an operator to switch between plurality of robots seamlessly, but also allows to monitor health conditions of the plurality of connected robots. According to an aspect of the present disclosure, methods and systems are provided for controlling multiple robots using single HMI device.

BRIEF DESCRIPTION OF THE SEVERAL VIEWS OF THE DRAWING(S)

FIG. 3(*b*) is a block diagram an exemplary system 200 connecting the HMI device to robot-4 via the Teach-Pendant Unit Multiplexer (TPU-MUX), in accordance with some embodiments of the present disclosure.

FIG. 4(*b*) is a chart of a selection of controller-4 among the plurality of controllers displayed on the HMI device to connect the HMI device to robot-4 (as shown in FIG. 3(*b*)), in accordance with some embodiments of the present disclosure.

FIG. 5(*b*) is a sequence diagram illustrating the steps performed by the TPU-MUX, upon receiving specific instructions from the HMI device.

FIG. 5(*c*) is a sequence diagram illustrating the steps performed by the TPU-MUX when turned ON for first time, in absence of specific instructions from the HMI device.

Figure 1:
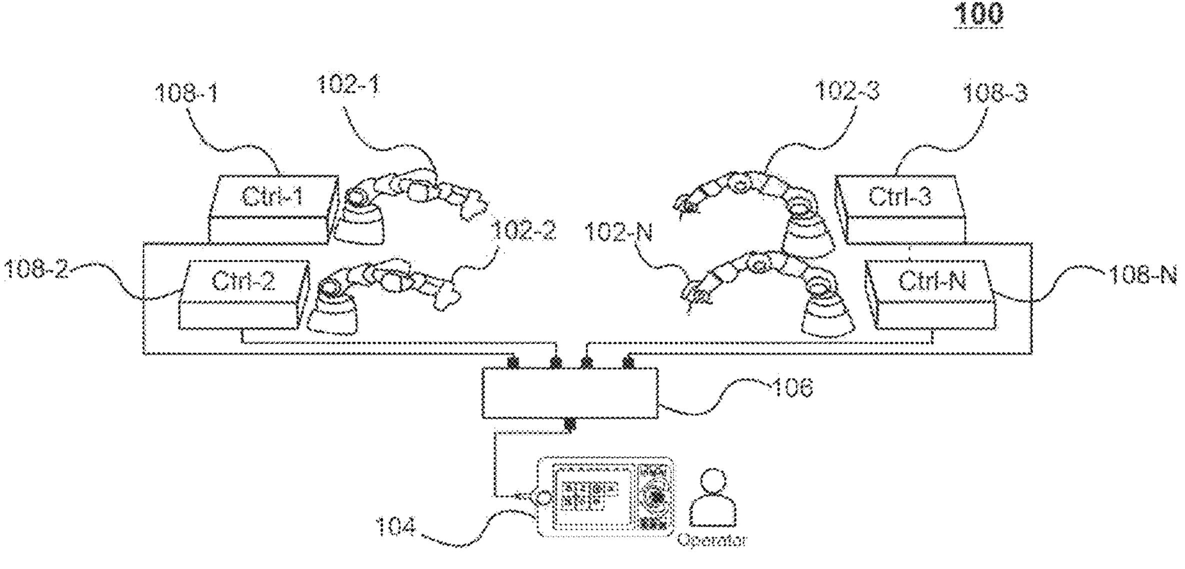
FIG. 1 is a diagram of an exemplary arrangement 100 showing plurality of robots connected to a single Human Machine Interface device (HMI) using a Teach Pendant unit Multiplexer (TPU-MUX), in accordance with some embodiments of the present disclosure.

It should be appreciated by those skilled in the art that any block diagrams herein represent conceptual views of the illustrative systems embodying the principles of the present disclosure. Similarly, it will be appreciated that any flowcharts, flow diagrams, state transition diagrams, pseudo code, and the like represent various processes which may be substantially represented in computer readable medium and executed by a computer or processor, whether or not such computer or processor is explicitly shown.

DETAILED DESCRIPTION OF THE INVENTION

In the following description, for purposes of explanation, numerous specific details are set forth in order to provide a thorough understanding of the present disclosure. It will be apparent, however, to one skilled in the art that the present disclosure can be practiced without these specific details. In other instances, apparatus and methods are shown in block diagram form only in order to avoid obscuring the present disclosure.

Reference in this specification to "one embodiment" or "an embodiment" means that a particular feature, structure, or characteristic described in connection with the embodiment is included in at least one embodiment of the present disclosure. The appearance of the phrase "in one embodiment" in various places in the specification are not necessarily all referring to the same embodiment, nor are separate or alternative embodiments mutually exclusive of other embodiments. Further, the terms "a" and "an" herein do not denote a limitation of quantity, but rather denote the presence of at least one of the referenced items. Moreover, various features are described which may be exhibited by some embodiments and not by others. Similarly, various requirements are described which may be requirements for some embodiments but not for other embodiments.

Some embodiments of the present disclosure will now be described more fully hereinafter with reference to the accompanying drawings, in which some, but not all, embodiments of the invention are shown. Indeed, various embodiments of the invention may be embodied in many different forms and should not be construed as limited to the embodiments set forth herein; rather, these embodiments are provided so that this disclosure will satisfy applicable legal requirements. Like reference numerals refer to like elements throughout. The use of any term should not be taken to limit the spirit and scope of embodiments of the present invention.

The embodiments are described herein for illustrative purposes and are subject to many variations. It is understood that various omissions and substitutions of equivalents are contemplated as circumstances may suggest or render expedient but are intended to cover the application or implementation without departing from the spirit or the scope of the present disclosure. Further, it is to be understood that the phraseology and terminology employed herein are for the purpose of the description and should not be regarded as limiting. Any heading utilized within this description is for convenience only and has no legal or limiting effect.

As discussed in the background section, controlling multiple robots using a single HMI device is not feasible as one HMI device can operate a single robot at a time. Even if the multiple robots are connected to the single HMI device, the operator needs to manually disconnect from one robot and then needs to connect with the other robot. Furthermore, there is no way by which a single HMI device may be used to continuously monitor the health conditions of plurality of connected robots or their associated controllers.

To overcome these and other problems, the present disclosure provides techniques (methods and systems) for controlling multiple robots using a single HMI device. Specially, the present disclosure describes a system having a Teach Pendant Unit Multiplexer (TPU-MUX) that allows multiple robots to remain connected to a single HMI device all at the same time and to switch between connected robots from a plurality of connected robots seamlessly. Further, the system describes the HMI device that allows an operator to easily switch from one robot to another robot without manually disconnecting from one robot and connecting with another robot. Moreover, the present disclosure describes a system that can also monitor the health of plurality of connected robots via the single HMI device.

Thus, the present disclosure enables controlling multiple robots via the single HMI device and monitoring the health condition of different robots simultaneously. Therefore, the techniques of the present disclosure reduce the overall cost of the system, especially in an industrial set-up, where multiple robots are required to perform certain tasks and are thus needed to be operated simultaneously. Furthermore, the techniques of the present disclosure reduce the complexity of such system and increase the performance and efficiency of the operator and the overall operations.

Referring to FIG. 1, which illustrates an exemplary embodiment 100 that shows a plurality of robots 102-1, 102-2, 102-3 . . . 102-N connected to a single HMI device 104 via a Teach Pendant Unit Multiplexer 106. Precisely, the Plurality of robots 102-1, 102-2, 102-3 . . . 102-N are connected to the Teach Pendant Unit Multiplexer 106 via their respective controllers 108-1, 108-2, 108-3 . . . 108-N. The embodiment simply discloses an exemplary arrangement which shows that using the techniques, disclosed in forthcoming paragraphs, any number of robots may be connected to the single HMI device 104. However, for the sake of simplicity and for the case of explanation all the forthcoming embodiments in the disclosure are explained by way of four robots connected to the single HMI device 104. Those skilled in the art will appreciate that there is no limitation to the number of robots that can be connected to the single HMI device 104.

Figure 2:
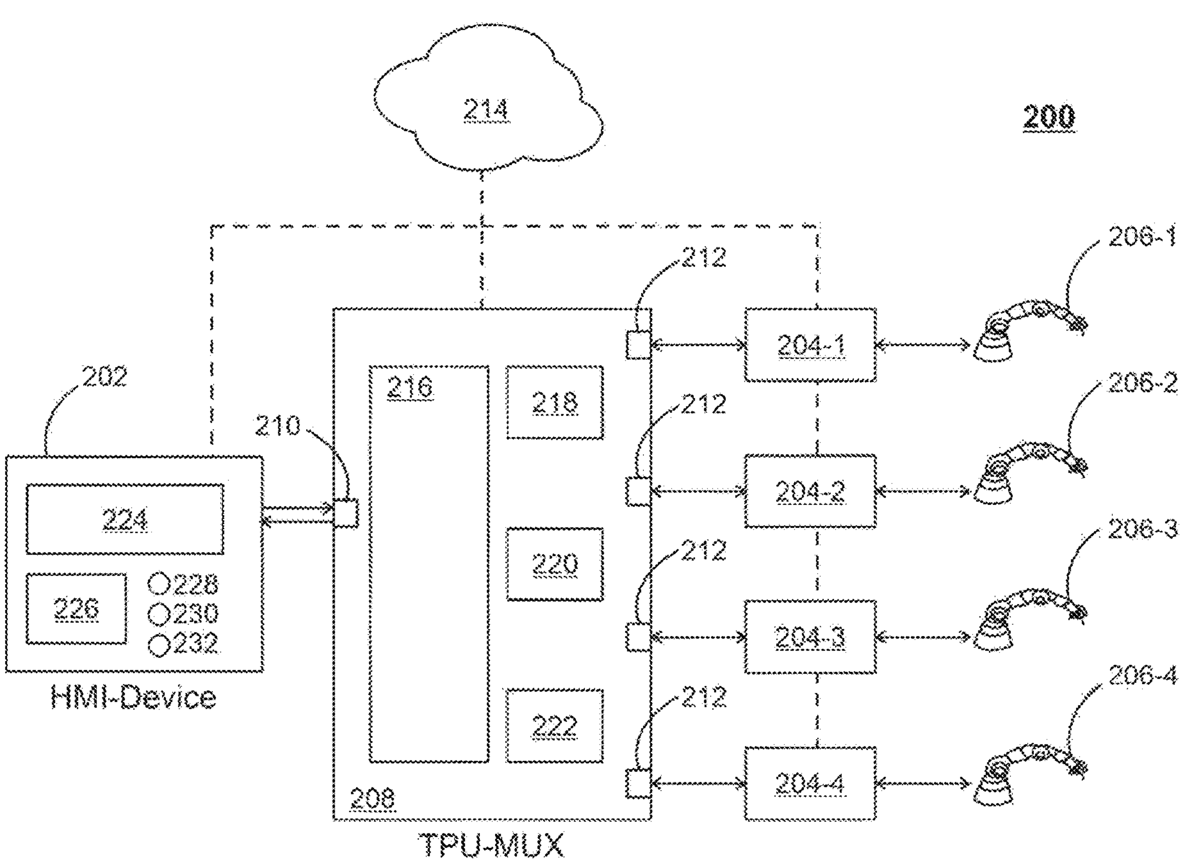
FIG. 2 is a block diagram of a system 200 showing four robots connected to a single HMI device using a Teach Pendant unit Multiplexer (TPU-MUX), in accordance with some embodiments of the present disclosure.

Referring now to FIG. 2, which illustrates another exemplary arrangement 200 showing four robots connected to single Human Machine Interface (HMI) device via a TPU-MUX. The arrangement 200 comprises a Human Machine Interface (HMI) device 202 also known as teach Pendant or Flex Pendant, four controllers 204-1, 204-2, 204-3 and 204-4, wherein each controller 204-1, 204-2, 204-3 and 204-4 corresponds to a particular robot 206-1, 206-2, 206-3 and 206-4 respectively. The arrangement further comprises a Teach Pendant Unit multiplexer (TPU-MUX) 208 that connects all four controller 204-1, 204-2, 203-3 and 204-4 to the HMI device 202.

In an aspect of the present disclosure, to connect the plurality of controllers 204-1, 204-2, 204-3 and 204-4 to the HMI device 202, the TPU-MUX 208 may comprise at least one input node 210 that allows the TPU-MUX 208 to connect with the HMI device 202 and a plurality of output nodes 212 that allow the plurality of controllers 204-1, 204-2, 204-3 and 204-4 to connect with the TPU-MUX 208. In the present embodiment, the TPU-MUX 208 is shown having four output nodes 212-1, 212-2, 212-3 and 212-4 each configured to allow only one controller 204-1, 204-2, 204-3 and 204-4 (per output node) to connect with the TPU-MUX 208. From the embodiment, it is evident that the plurality of output nodes 212-1, 212-2, 212-3 and 212-4 and the plurality of controllers 204-1, 204-2, 204-3 and 204-4 are connected in a 1:1 configuration, thus the number of output nodes 212-1, 212-2, 212-3 and 212-4 may vary with the number controllers 204-1, 204-2, 204-3 and 204-4 desired to be connected to the HMI device 202.

Specifically, the plurality of controller 204-1, 204-2, 204-3 and 204-4 and the HMI device 202 are connected to the TPU-MUX 208 (through input and output nodes 210, 212) via one or more physical wires. However, the present disclosure is not limited to the wired communication technology but may be extended to other wireless means of communication known to a person skilled in the art. Additionally, to allow the HMI device 202 to communicate with the plurality of controller 204-1, 204-2, 204-3 and 204-4 via the TPU-MUX 208 and vice-versa, the HMI device 202, the plurality of controller 204-1, 204-2, 204-3 and 204-4 and the TPU-MUX 208 remain connected through a network 214. The network 214 allows these devices (as disclosed in the system 200) to communicate with each other.

The network 214 may comprise a data network such as, but not restricted to, the Internet, Local Area Network (LAN), Wide Area Network (WAN), Metropolitan Area Network (MAN), etc. In certain embodiments, the network 214 may include a wireless network, such as, but not restricted to, a cellular network and may employ various technologies including Enhanced Data rates for Global Evolution (EDGE), General Packet Radio Service (GPRS), Global System for Mobile Communications (GSM), Internet protocol Multimedia Subsystem (IMS), Universal Mobile Telecommunications System (UMTS) etc. In one embodiment, the network 214 may include or otherwise cover networks or subnetworks, each of which may include, for example, a wired or wireless data pathway.

Further, as shown in FIG. 2, the TPU-MUX 208 comprises a processor 216, a memory 218 communicatively coupled to the processor 216, an HTTPs Server module 220 and a switch control module 222. In an exemplary embodiment, the memory 216 stores processor-executable instructions, which on execution, cause the processor 216 to allow the HMI device 208 to communicate with one of the plurality of connected controllers 204-1, 204-2, 204-3 and 204-4 one at a time. In another exemplary embodiment, the memory 216 stores processor-executable instructions, which on execution, cause the processor 216 to allow the HMI device 202 to switch, using the switch control module 222, from one controller to another, among the plurality of controllers 204-1, 204-2, 204-3 and 204-4.

In one embodiment, the processor 216 may include, but not restricted to, a general-purpose processor, a Field Programmable Gate Array (FPGA), an Application Specific Integrated Circuit (ASIC), a Digital Signal Processor (DSP), microprocessors, microcomputers, micro-controllers, central processing units, state machines, logic circuitries, and/or any devices that manipulate signals based on operational instructions. A processor may also be implemented as a combination of computing devices, e.g., a combination of a DSP and a microprocessor, a plurality of microprocessors, one or more microprocessors in conjunction with a DSP core, or any other such configuration.

In another embodiment, the memory 218 communicatively coupled to the processor 216 may comprise various instructions, information related to controlling plurality of controllers etc. The memory 218 may include a Random-Access Memory (RAM) unit and/or a non-volatile memory unit such as a Read Only Memory (ROM), optical disc drive, magnetic disc drive, flash memory, Electrically Erasable Read Only Memory (EEPROM), a memory space on a server or cloud and so forth.

In a preferred embodiment, when the TPU-MUX 208 is connected to all four controllers 204-1, 204-2, 204-3 and 204-4 and the HMI device 202 and the TPU-MUX 208 is turned ON, the processor 216 may fetch at least one of: active list of the plurality of controllers 204-1, 204-2, 204-3 and 204-4, event logs, system information and system files from the plurality of controllers 204-1, 204-2, 204-3 and 204-4 connected to the TPU-MUX 208. The processor 216 may store the fetched information in the memory 218 for future use i.e., in an event anticipating communication with the HMI device 202. In addition, the processor 216 may communicate with the HTTPs server module 220 to identify a default controller, out of the plurality of controllers 204-1, 204-2, 204-3 and 204-4, to which the processor 216 was last communicating, before the TPU-MUX 208 was switched OFF. In response, to the identification, the processor 216 connects to the identified controller for further communication until a specific request (for change of the controller) from the HMI device 202 is received. Further, in absence of specific instructions from the HMI device 202, the processor 216 switches the connected controller to manual mode and turns motor (not shown) of the connected controller to OFF state.

In another preferred embodiment, when the TPU-MUX 208, all four controllers 204-1, 204-2, 204-3 and 204-4 and the HMI device 202 are connected to each other and are in ON state, the TPU-MUX 208 may receive a request from the HMI device 202 to fetch at least one of: active list of the plurality of controllers 204-1, 204-2, 204-3 and 204-4, event logs, system information and system files from the plurality of controllers 204-1, 204-2, 204-3 and 204-4 connected to the TPU-MUX 208. In response, the processor 216 of the TPU-MUX 208 may communicate with all the connected controllers 204-1, 204-2, 204-3 and 204-4 to retrieve the requested information. Once, the information is fetched, the processor 216 may share the fetched active list of the plurality of controllers 204-1, 204-2, 204-3 and 204-4, the event logs, the system information and the system files with the HMI device 202. In an exemplary embodiment, the information may be shared with the HMI device 202 in an XML file format, or any other similar format understood by the HMI device 202. In an aspect, if the TPU-MUX 208 is already in possession of the information (as discussed in above embodiment), the TPU-MUX 208 may retrieve the information from the memory 218 and share it with the HMI device 202, instead of fetching it again from the plurality of the controllers 204-1, 204-2, 204-3 and 204-4.

In an exemplary embodiment, the TPU-MUX 208 may employ a plurality of filters so that only relevant information, from the fetched information, such as controller ID's and system names, controller serial no's etc. of the plurality of controllers 204-1, 204-2, 204-3 and 204-4 connected to the TPU-MUX 208, along with the event logs is shared, with the HMI device 202. Further, as shown in FIG. 2, the HMI device 202 may comprise an interactive display 224, a processor 226. The information received from the TPU-MUX 208 is presented on the display of 224 of the HMI device 202 in a presentable format. In particular, the HMI device 202 displays the information regarding plurality of controllers 204-1, 204-2, 204-3 and 204-4 in the form of icons (as shown in FIGS. 4(*a*) and 4(*b*)), wherein each icon is supplemented with information including the controller ID's and the system names etc., all at the same time.

The interactive display 224 of the HMI device 202 allows operator to select any one of the plurality of controllers 204-1, 204-2, 204-3 and 204-4 to control the respective robots 206-1, 206-2, 206-3 and 206-4 to perform desired functionality. Precisely, in response, to the operator selection the processor 226 of the HMI device 202 shares the details of the selected controller including but limited to controller ID, controller name etc. with the processor 216 of the TPU-MUX 208. The processor 216 sends this request to the HTTPs server module 220 to identify the controller selected by the HMI device 202. In response, the HTTPs server module 220 shares the information indicating the controller selected, among the plurality of controller 204-1, 204-2, 204-3 and 204-4, to the processor 216. The processor 216 may then pass the details of the selected controller to the switch control module 222 instructing the switch control module to switch to the selected controller.

The switch control module 222 connects the HMI device 202 to the selected controller, an Acknowledgment (ACK) signal is sent from the TPU-MUX 208 to the HMI device 202, indicative of successful handshake between the HMI device 202 and the selected controller. In an exemplary aspect, if the TPU-MUX 208 is not able to connect the HMI device 202 to the selected controller, for any reason, a Non-Acknowledgement (NACK) signal is sent to the HMI device 202 indicating handshake failure between the HMI device 202 and the selected controller. On occurrence of such event, the processor 226 of the HMI device 202 may process the event logs of the selected controller to identify the reason for connection failure.

However, the HMI device 202 upon getting a confirmation that it is connected to the selected controller may allow the operator to perform various talks (with the selected robot) through the connected controller. In particular, the processor 216 of the TPU-MUX 208 upon receipt of any of the below signal/command from the HMI device 202 allows the HMI device 202 to communicate with the connected controller to perform at least one of the desired tasks listed below. In an exemplary embodiment, the below listed tasks may include various other essential tasks that may be performed by the connected robots and are not limited to same:

- Get all mode status from connected controllers.
- Enable Device functionality with selected controller and activated system
- Teaching functionality
- Jogging functionality
- Backup and restore functionality
- All Restart functionality and several other like functionalities.

In addition, upon receiving specific request from the HMI device 202, the processor 216 of the TPU-MUX 208 may further allow the HMI device 202 to perform any of the below mentioned tasks:

- Get all motor state from connected controller.
- Get Write and Read access details for all connected controllers.
- Revoke Write Access from all connected controllers (on Open operator panel page/tab functionality)
- Set mode (auto or manual or Manual full speed) to all connected controllers (Except maintenance robot/controller) on basis of user selection/action.
- Set motor (On or Off) to all connected controllers (Except maintenance robot/controller) on basis of user selection/action.
- Start program (Except maintenance robot/controller) to all connected controllers on basis of user selection/action.
- Stop program (Except maintenance robot/controller) to all connected controllers on basis of user selection/action.
- Revoke Write Access from all connected controllers (on Open operator panel page/tab functionality).
- Get maintenance state from all connected controllers.
- Maintenance/Program State xml file and several other like functionalities.

Figure 3A:
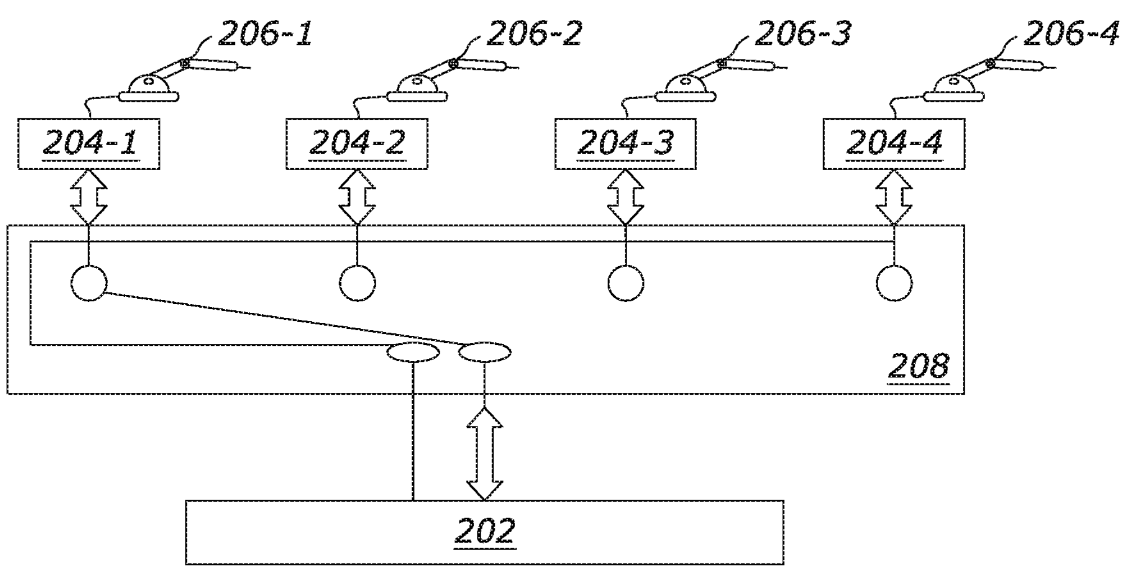
FIG. 3(*a*) is a block diagram an exemplary system 200 connecting the HMI device to robot-1 via the Teach-Pendant Unit Multiplexer (TPU-MUX), in accordance with some embodiments of the present disclosure.
Figure 3B:
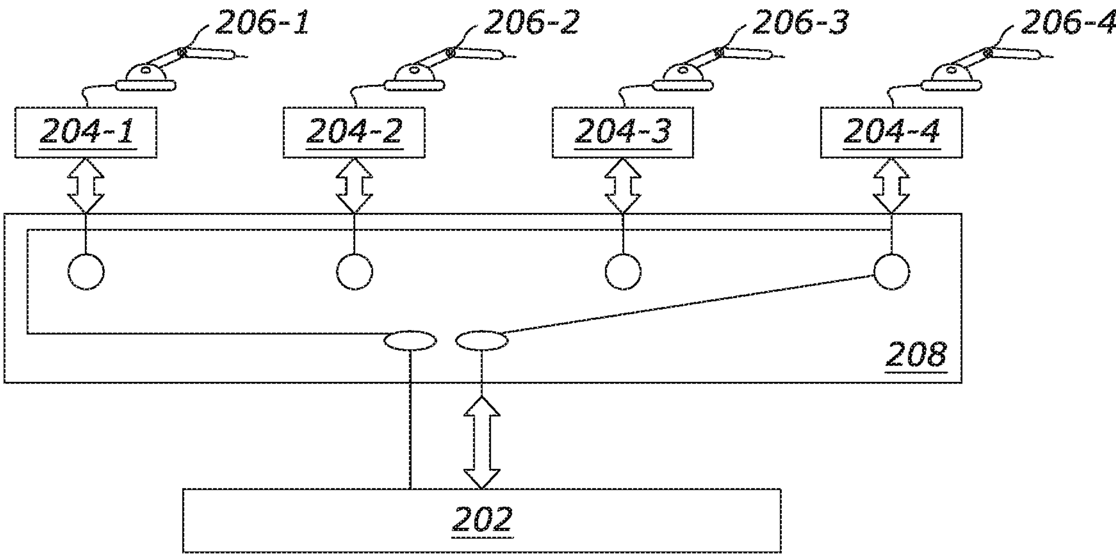
Figure 4A:
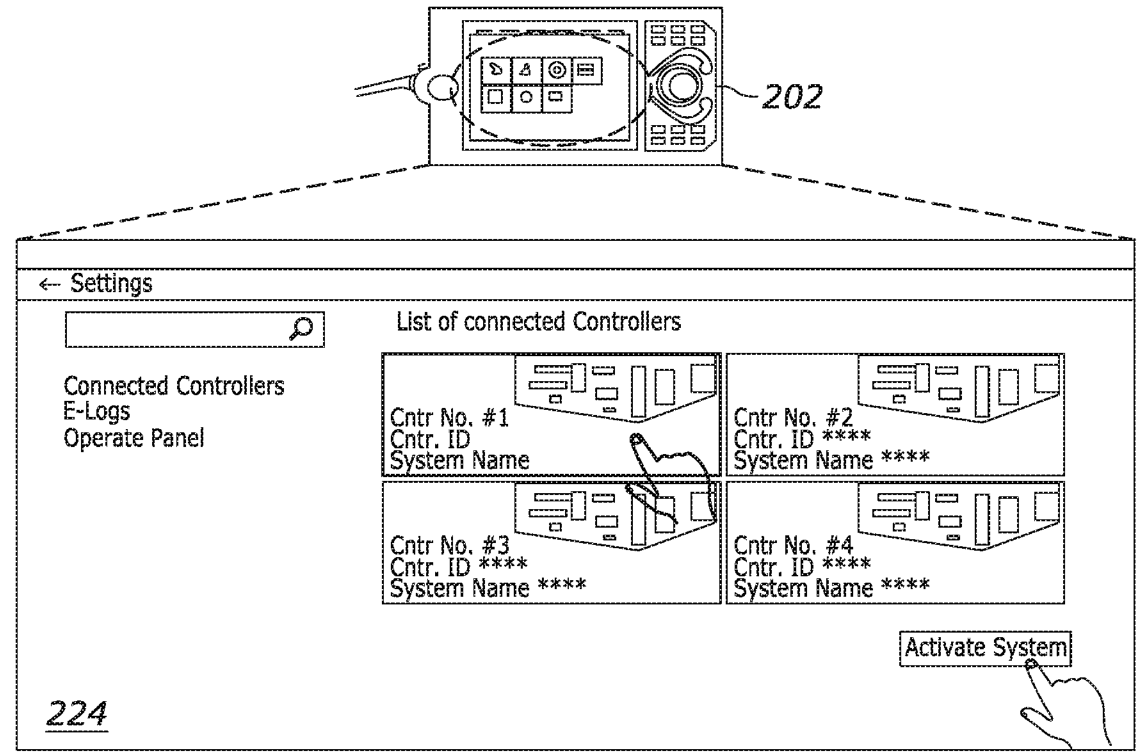
FIG. 4(*a*) is a chart of a selection of controller-1 among the plurality of controllers displayed on the HMI device to connect the HMI device to robot-1 (as shown in FIG. 3(*a*)), in accordance with some embodiments of the present disclosure.

In addition, the processor 216 upon receiving instructions from the HMI device 202 may allow the HMI device 202 to switch from among the plurality of controllers 204-1, 204-2, 204-3 and 204-4. The same may be understood with the help of FIGS. 3*a*, 4*a* and 3*b*, 4*b*. As shown in FIG. 4*a*, if controller 204-1 corresponding to robot 206-1 is selected using the interactive display 224 of the HMI device 202, a signal indicating the selection along with the information regarding the selected controller (such as controller ID, system name etc.) is sent to the processor 216 of the TPU-MUX 208. The processor 216, upon receiving the signal, sends the information to the HTTPs server module 220 for identification as to which controller is selected. In response, the HTTPs server module 220 shares the identified controller information with the processor 216 and the processor 216 activates the switch control module 222 to switch to controller 204-1 as shown in FIG. 3*a*.

Figure 4B:
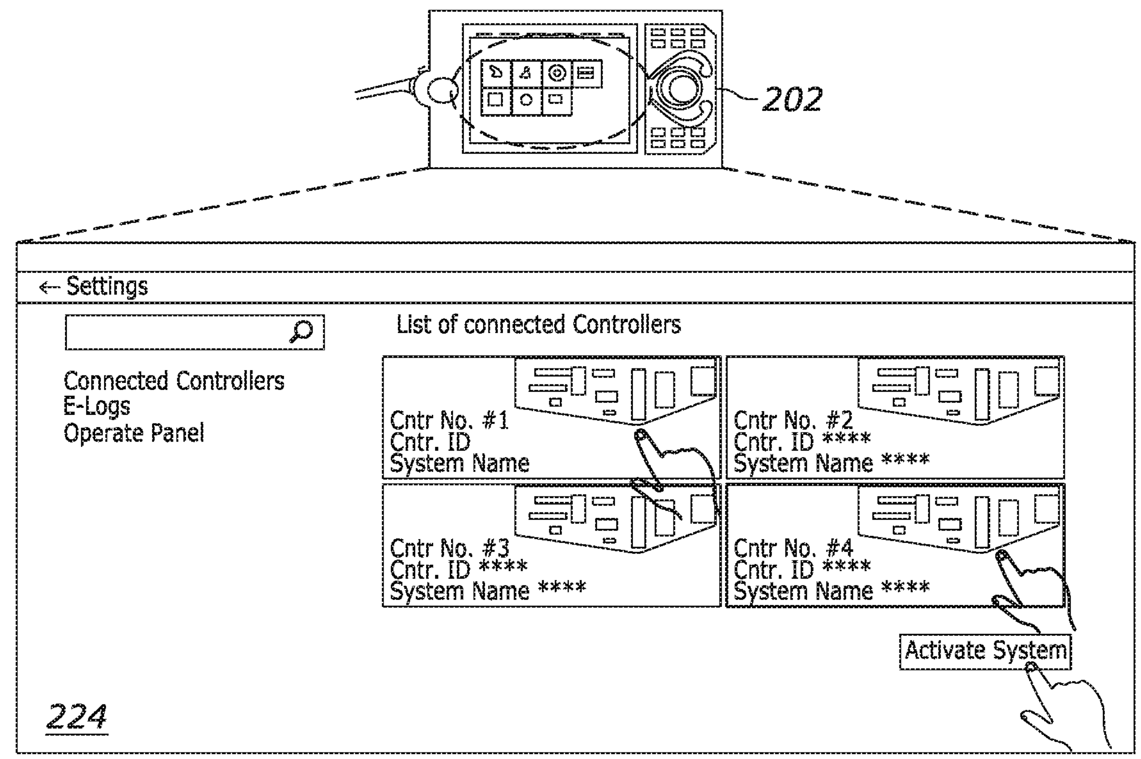

Further, when another controller is selected, using the display 224 of the HMI device 202, as shown in FIG. 4*b* i.e., controller 204-4 corresponding to robot 206-4 is selected, a signal indicating the selection along with the information regarding the selected controller (such as controller ID, system name etc.) is once again sent to the processor 216 of the TPU-MUX 208. The processor 216, upon receiving such signal, may send this information to the HTTPs server module 220 for identification as to which controller is selected. Once, the HTTPs server module 220 confirms that a different controller i.e., other than controller 204-1 is selected, the processor 216 sends a signal to the switch control module 222 to stop all communications with the controller 204-1 and establish connection with newly selected controller 204-4, as shown in FIG. 3(*b*). Thus, the processor 216 of the TPU-MUX 208 allows the HMI device 202 of system 200 to switch from one controller to another among plurality of controllers 204-1, 204-2, 204-3 and 204-4, without any manual disconnection of wires, via the case of signal command.

Additionally, the processor 216 may perform various other functions such as enable a device, emergency stop function for at least one of the plurality of connected controllers 204-1, 204-2, 204-3 and 204-4 based on single input command/signal from the HMI device 202. In an aspect, the HMI device 202, as shown in FIG. 2, comprises a plurality of switching modules including an enable switch 228, an emergency stop switch 230 and a power switch 232.

In an exemplary aspect, upon selecting the enable switch 228, the processor 226 of the HMI device 202 sends enable signal, for the connected controller, to TPU-MUX 208. The processor 216 of the TPU-MUX sends this enable signal without any interference to the connected controller. Specifically, the enable switch 228 is a manually operated, constant pressure push-button which, when continuously activated in a predefined position only, allows potentially hazardous functions but does not initiate them. In any other position, hazardous functions are stopped safely. Further, the enable switch 228 is of a specific type where must be pressed only half-way to activate it. In the fully in and fully out positions, manipulator operation is impossible.

In another exemplary aspect, upon selecting the emergency stop switch 230, a signal indicating emergency stop is sent to the processor 216 of the TPU MUX 208, by the processor 226 of the HMI device 202. The processor 216 upon receiving such signal takes precedence over all the robot controls, causes all controlled hazards to stop, removes drive power from the robot actuators, remains active until it is reset, and can only be reset by manual action. In an aspect, an emergency stop state means that all power is disconnected from the controllers 204-1, 204-2, 204-3 and 204-4 of the plurality of robots 206-1, 206-2, 206-3 and 206-4 respectively, except for the manual brake release circuits (not shown).

In another exemplary embodiment, the TPU-MUX 208 may employ an external PLC controller (not shown) or any other similar controller for performing emergency stop functionality. Precisely, in the embodiment, the PLC controller remains connected to all the plurality of controllers 204-1, 204-2, 204-3 and 204-4 along with the TPU-MUX 208. Thus, when an emergency stop functionality is activated from the HMI device 202 and a corresponding signal is sent to the processor 216 of the TPU-MUX 208, the processor 216 sends this signal, without any change, to the PLC controller, wherein the PLC controller send an emergency stop signal to the plurality of controllers 204-1, 204-2, 204-3 and 204-4 and stops all the plurality of controllers 204-1, 204-2, 204-3 and 204-4.

Figure 5A:
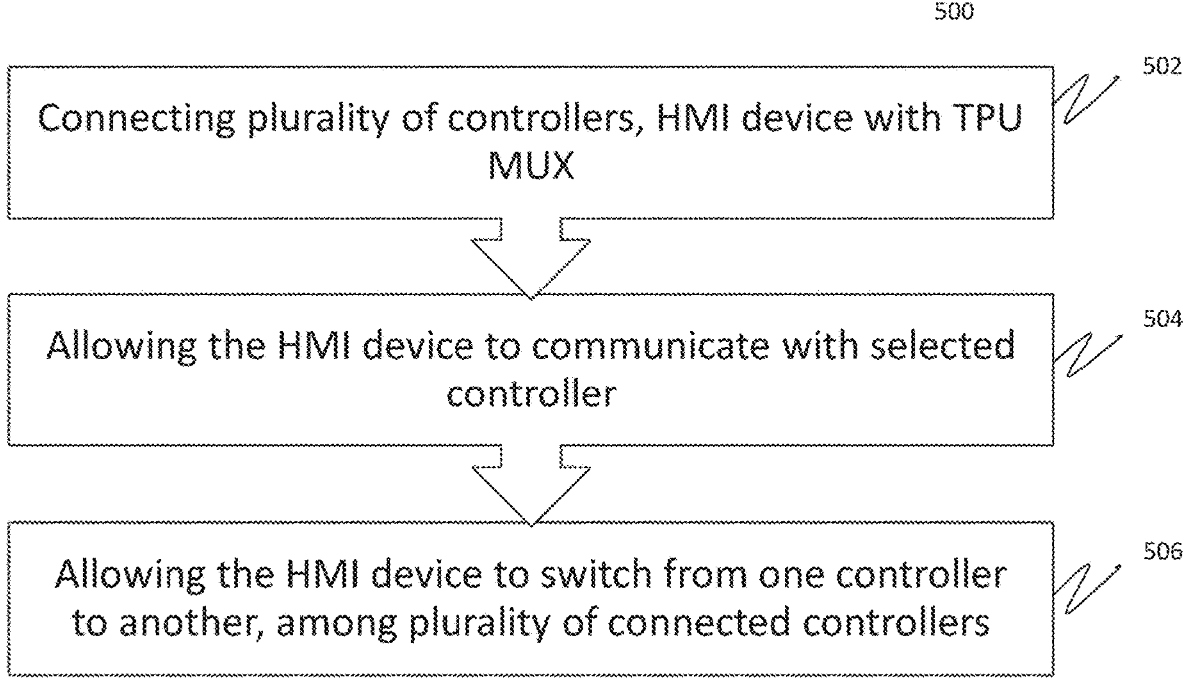
FIG. 5(*a*) is a flowchart 500 illustrating a method for controlling multiple robots by a single HMI device, in accordance with some embodiments of the present disclosure.

Referring now to FIG. 5(*a*), a flowchart is described illustrating an exemplary method 500 for connecting and communicating with plurality of robots 206-1, 204-2, 206-3 and 206-4, using the single HMI device 202, according to an embodiment of the present disclosure. The method 500 is merely provided for exemplary purposes, and embodiments are intended to include or otherwise cover any methods or procedures for connecting and communicating with plurality of robots 206-1, 206-2, 206-3 and 206-4 using the single HMI device 202.

The method 500 includes, at block 502, connecting the TPU-MUX 208 to the plurality of robots 206-1, 206-2, 206-3 and 206-4 (via their corresponding controllers 204-1, 204-2, 204-3 and 204-4 respectively) and the HMI device 202. The operations of block 502 may be performed by the processor 216, using the HTTPs server module 220 and plurality of Input/Output nodes 210, 212 of FIG. 2.

At block 504, the method 500 includes allowing the HMI device 202 to communicate with one of the connected robots 206-1, 206-2, 206-3 and 206-4 (via their corresponding controllers 204-1, 204-2, 204-3 and 204-4 respectively), in response to receiving signal from the HMI device 202. Detailed flow diagram of the same is explained in below paragraphs with reference to FIG. 5(*b*). The operations of block 504 may be performed by the processor 216 in combination with HTTPs server module 220 and the memory 218 of FIG. 2.

Figure 5B:
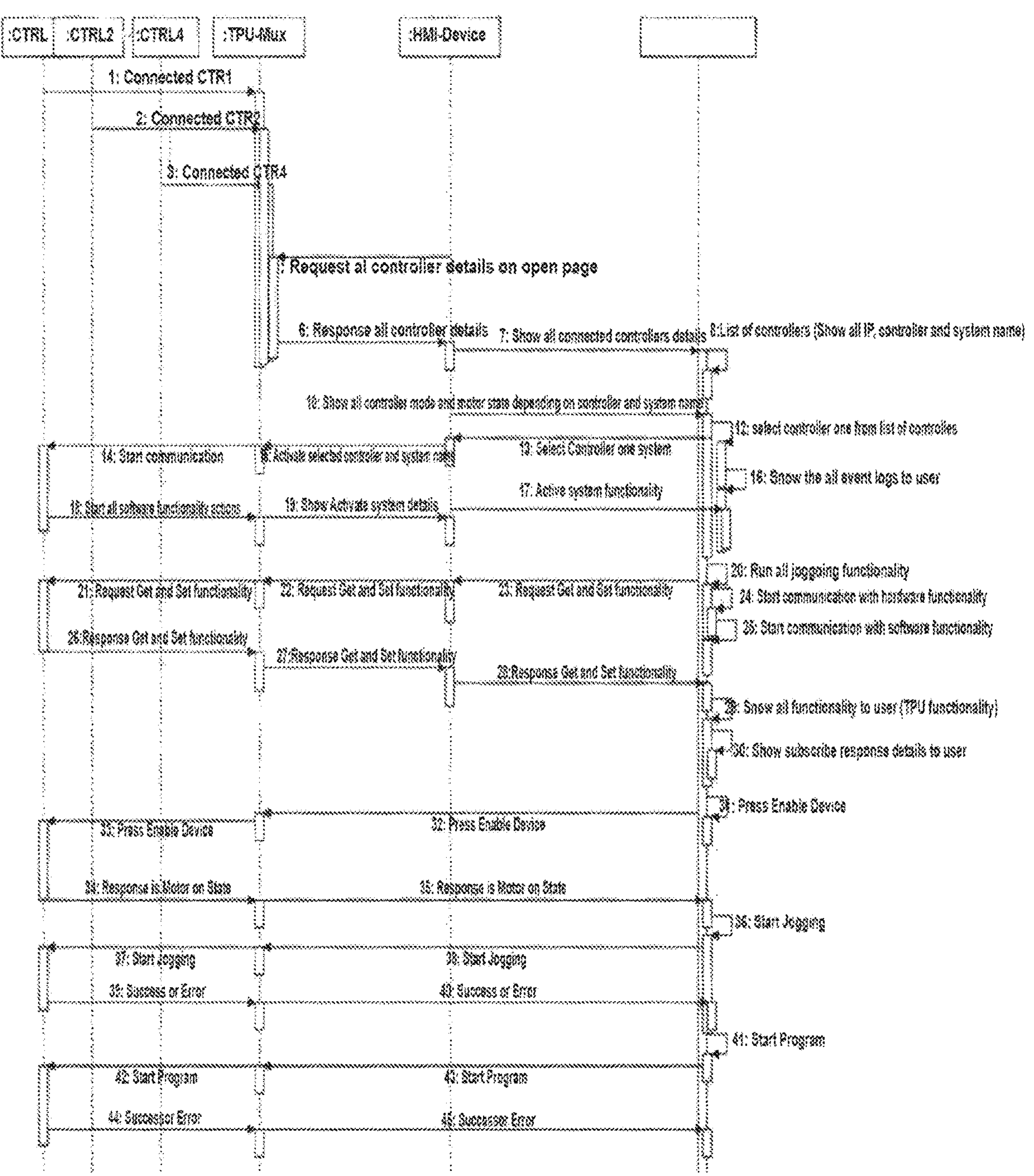

As shown in FIG. 5*b*, when the plurality of controllers 204-1, 204-2, 204-3 and 204-4, the HMI device 202 and the TPU-MUX 208 are connected, they may communicate with each other. In an exemplary embodiment, the process comprises receiving by the TPU-MUX 208, from the HMI device 202, request for fetching details of the plurality of connected controller 204-1, 204-2, 204-3 and 204-4, as shown in step 4. As next step, the process discloses sharing, by the TPU-MUX 208, the fetched details of the plurality of controller 204-1, 204-2, 204-3 and 204-4 with the HMI device 202, as shown in steps 6-8. In an exemplary embodiment, sharing the fetched details, as shown in step 6, with the HMI device 202 includes sharing one of controller ID's and system names, of the plurality of controllers 204-1, 204-2, 204-3 and 204-4, connected to the TPU-MUX 208, along with the event logs.

The process further discloses receiving, by the TPU-MUX 208, request from the HMI device indicating selection of a controller among the plurality of controllers 204-1, 204-2, 204-3 and 204-4, as shown in step 13. In a subsequent step 15, the process discloses receiving, by the TPU-MUX 208, signal indicating activation of the selected controller. In response to the selection and activation, the process discloses allowing the HMI device 202 to communicate with the selected controller, as shown in step 14.

In particular, upon activating the selected controller, the method 500 at step 504 comprises allowing the HMI device 202 to communicate with the selected controller to carry out any of functionalities, with the activated robot, as described in steps 16-45 of FIG. 5*b*.

In an exemplary embodiment, the method 500 at step 504 comprises allowing the HMI device 202 to communicate with the activated controller to perform at least one of:

Get all mode status from connected controllers.

Enable Device functionality with selected controller and activated system

Teaching functionality

Jogging functionality

Backup and restore functionality

All Restart functionality and several other like functionalities.

In another exemplary embodiment, the method 500 at step 504, comprises allowing the HMI device 202 to communicate with the activated controller to perform at least one of:

Get all motor state from connected controller.

Get Write and Read access details for all connected controllers.

Revoke Write Access from all connected controllers (on Open operator panel page/tab functionality)

Set mode (auto or manual or Manual full speed) to all connected controllers (Except maintenance robot/controller) on basis of user selection/action.

Set motor (On or Off) to all connected controllers (Except maintenance robot/controller) on basis of user selection/action.

Start program (Except maintenance robot/controller) to all connected controllers on basis of user selection/action.

Stop program (Except maintenance robot/controller) to all connected controllers on basis of user selection/action.

Revoke Write Access from all connected controllers (on Open operator panel page/tab functionality).

Get maintenance state from all connected controllers.

Maintenance/Program State xml file and several other like functionalities.

Moving on the method 500, at step 506, discloses allowing the HMI device 202 to switch from one controller to another, among the plurality of controllers 204-1, 204-2, 204-3 and 204-4. In an exemplary embodiment, in order to achieve the above step, the method 500 discloses displaying icons for the plurality of controllers 204-1, 204-2, 204-3 and 204-4, on the HMI device 202, along with the controller ID's and the system names, at the same time, as shown in step 8 of FIG. 5*b*. The method 500 further comprises allowing selection of any one of the plurality of controllers 204-1, 204-2, 204-3 and 204-4 for controlling respective robot, as shown in step 12 of FIG. 5*b*.

In response to the selection, the process further discloses receiving, by the TPU-MUX 208, request from the HMI device 202 indicating selection of a new controller among the plurality of controllers 204-1, 204-2, 204-3 and 204-4, as shown in step 13. Further, as a subsequent step 15, the process discloses receiving, by the TPU-MUX 208, signal indicating activation of the selected controller. In response to the selection and activation, the process discloses allowing the HMI device 202 to communicate with the selected controller, as shown in step 14.

As a result of the activation, the method 500 at step 506 discloses allowing the HMI device 202 to switch from the old controller to the newly selected controller and communicate with the newly selected controller to carry out any of functionalities, with the newly activated robot, as described in steps 16-45 of FIG. 5*b* and above paragraphs. Further, explanation of same is avoided for the sake of brevity.

In addition, though not exclusively disclosed the method 500 after step 502, prior to step 504, may include an addition embodiment comprising allowing the HMI device 202 to initially communicate with a default controller connected to the TPU-MUX 208, in an event when TPU-MUX 208 is switched ON for first time. FIG. 5(*c*), discloses the additional embodiment, where the TPU-MUX 208, the plurality of controllers 204-1, 204-2, 204-3 and 204-4 and the HMI device 202 are connected together and the TPU-MUX 208 is in ON state, and there are no specific instructions is received from the HMI device 202.

Figure 5C:
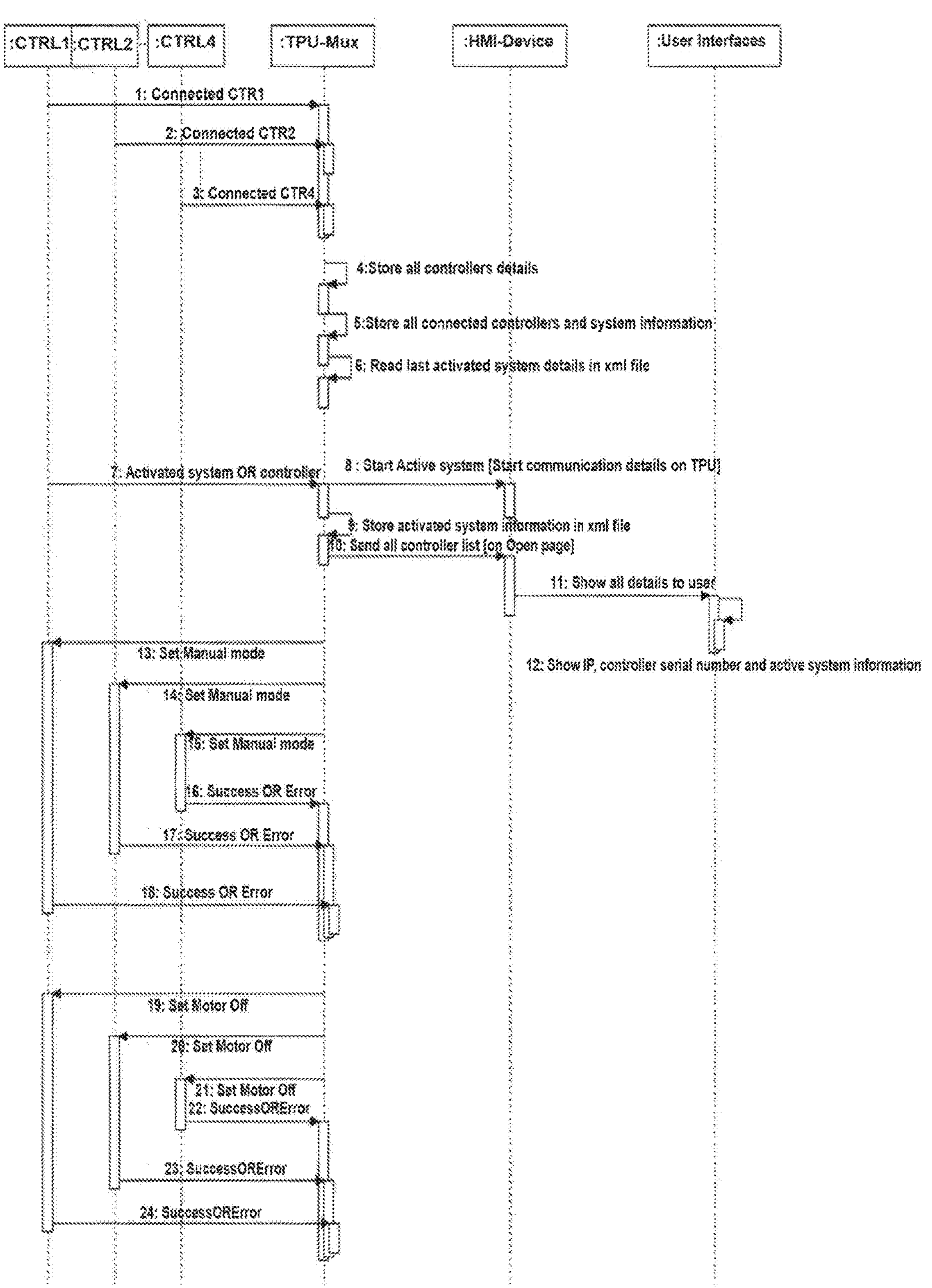

As shown in FIG. 5*c* upon turning the TPU-MUX 208 ON, the process discloses fetching, by the TPU-MUX 208, at least one of: active list of the plurality of controllers 204-1, 204-2, 204-3 and 204-4 connected to the TPU-MUX 208, event logs, system information and system files, as shown in step 4. Further, at step 5, the process discloses storing the fetched information in the memory 218. The process (as shown in FIG. 5(*c*)) further, at step 6, discloses finding out the information regarding the last activated controller, before turning the TPU-MUX 202 to OFF state. The process then moves to step 8, which comprises connecting back with the last activated controller.

Upon successful completion of step 8, the process discloses setting the connected controller to manual mode and the motor of the selected controller to OFF state, as discussed in steps 13-24 of FIG. 5(*c*) until receiving specific instructions from the HMI device 202. In an exemplary embodiment, all the step disclosed in FIG. 5(*c*) are performed at TPU-MUX 208 by the processor 216 in combination with HTTPs server module 220 and the switch control module 222.

The order in which the various operations of the method 500 are described is not intended to be construed as a limitation, and any number of the described method blocks can be combined in any order to implement the method. Additionally, individual blocks may be deleted from the methods without departing from the spirit and scope of the subject matter described herein. Furthermore, the methods can be implemented in any suitable hardware, software, firmware, or combination thereof.

The various operations of method described above may be performed by any suitable means capable of performing the corresponding functions. The means may include various hardware and/or software component(s) and/or module(s), including, but not limited to the processor 216, the HTTPs server 220 and the switch control module 222 of the TPU-MUX 208 and the processor 226 and display 224 of the HMI device 202 of FIG. 2. Generally, where there are operations illustrated in Figures, those operations may have corresponding counterpart means-plus-function components.

It may be noted here that the subject matter of some or all embodiments described with reference to FIGS. 1-4 may be relevant for the methods and system and the same is not repeated for the same of brevity.

In a non-limiting embodiment of the present disclosure, one or more non-transitory computer-readable media may be utilized for implementing the embodiments consistent with the present disclosure. A computer-readable media refers to any type of physical memory (such as the memory 218) on which information or data readable by a processor may be stored. Thus, a computer-readable media may store one or more instructions for execution by the processor 216, including instructions for causing the processor 216 to perform steps or stages consistent with the embodiments described herein. The term "computer-readable media" should be understood to include tangible items and exclude carrier waves and transient signals. By way of example, and not limitation, such computer-readable media can comprise Random Access Memory (RAM), Read-Only Memory (ROM), volatile memory, non-volatile memory, hard drives, Compact Disc (CD) ROMs, Digital Video Disc (DVDs), flash drives, disks, and any other known physical storage media.

Thus, certain aspects may comprise a computer program product for performing the operations presented herein. For example, such a computer program product may comprise a computer readable media having instructions stored (and/or encoded) thereon, the instructions being executable by one or more processors to perform the operations described herein. For certain aspects, the computer program product may include packaging material.

Various components, modules, or units are described in this disclosure to emphasize functional aspects of devices configured to perform the disclosed techniques, but do not necessarily require realization by different hardware units. Rather, as described above, various units may be combined in a hardware unit or provided by a collection of interoperative hardware units, including one or more processors as described above, in conjunction with suitable software and/or firmware.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based here on. Accordingly, the embodiments of the present invention are intended to be illustrative, but not limiting, of the scope of the invention, which is set forth in the appended claims.

In a non-limiting embodiment of the present disclosure, the present application discloses a system to control plurality of robots. The system comprising a Human Machine Interface (HMI) device, a plurality of controllers, wherein each of the controllers correspond to a particular robot and a Teach-Pendant Unit Multiplexer (TPU-MUX). The TPU-MUX further comprising a processor and a memory communicatively coupled to the processor. In an embodiment, the memory stores processor-executable instructions, which on execution, cause the processor to allow the HMI device to communicate with one of the plurality of controllers at a time and allow the HMI device to switch from one controller to another, among the plurality of controllers.

In another non-limiting embodiment of the present disclosure, the TPU-MUX further comprises an input node to connect the TPU-MUX to the HMI device and a plurality of output nodes to connect the TPU-MUX to the plurality of controllers. In an aspect, the plurality of output nodes and the plurality of controllers are connected in 1:1 configuration.

In another non-limiting embodiment of the present disclosure, the instructions when executed causes the processor to allow the HMI device to initially communicate with a default controller connected to the TPU-MUX, in an event when TPU-MUX is switched ON for first time.

In another non-limiting embodiment of the present disclosure, the instructions stored in the memory when executed cause the processor to fetch at least one of: active list of the plurality of controllers connected to the TPU-MUX, event logs from the plurality of controllers, system information and system files, in an event when the TPU-MUX is turned ON or when requested by the HMI device. Further, the instructions when executed cause the processor to share the fetched active list of the plurality of controllers, the event logs, the system information and the system files with the HMI device.

In another non-limiting embodiment of the present disclosure, the instruction stored in the memory when executed cause the processor to share one of controller ID's and system names, of the plurality of controllers, connected to the TPU-MUX, along with the event logs with the HMI device.

In another non-limiting embodiment of the present disclosure, the HMI device comprises an interactive User Interface (UI) that displays icons for the plurality of controllers, along with the controller ID's and the system names, all at the same time.

In another non-limiting embodiment of the present disclosure, the displayed icons allow selection of one of the plurality of controllers to control respective robot and monitor the health of the plurality of controllers by evaluating the event logs.

In another non-limiting embodiment of the present disclosure, the HMI device further comprises a plurality of switching modules that allow to execute at least one of enable, disable and emergency stop function for any of the plurality of connected controllers.

In another non-limiting embodiment of the present disclosure, the present application discloses a method for controlling plurality of robots. The method comprising connecting a plurality of controllers to a Human Machine Interface (HMI) device, via a Teach Pendant Unit Multiplexer (TPU-MUX) and allowing the HMI device to communicate with one of the plurality of controllers at time. The method further comprises allowing the HMI device to switch from one controller to another, among the plurality of controllers.

The foregoing summary is illustrative only and is not intended to be in any way limiting. In addition to the illustrative aspects, embodiments, and features described above, further aspects, embodiments, and features will become apparent by reference to the drawings and the following detailed description.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and "at least one" and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

REFERENCE NUMERALS:

| Reference Number | Description |
|---|---|
| 100 | Arrangement |
| 200 | system |
| 102 (1-N) and 206 (1-4) | Robots |
| 108 (1-N) and 204 (1-4) | controllers |
| 104 and 202 | Human Machine Interface (HMI) Device |
| 106 and 208 | Teach Pendant Unit Multiplexer (TPU-MUX) |
| 204 | Input nodes of TPU-MUX |
| 212 (1-4) | Output nodes of TPU-MUX |
| 214 | Network |
| 216 | Processor of TPU-MUX |
| 218 | memory of TPU-MUX |
| 220 | HTTPs Server Module |
| 222 | Switch control module |
| 224 | Display of the HMI device |
| 226 | Processor of the HMI device |
| 328 | Enable switch |
| 230 | emergency stop switch |
| 232 | Power switch |
| 500 | Method |
| 502-506 | Method steps |

What is claimed is:

1. A system for controlling a plurality of robots, comprising:
- a Human Machine Interface (HMI) device;
- a plurality of controllers, wherein each of the controllers correspond to a particular robot; and
- a physical Teach-Pendant Unit Multiplexer (TPU-MUX) comprising a processor, and a memory communicatively coupled to the processor;
- wherein the memory stores processor-executable instructions, which on execution, cause the processor to:
- allow the HMI device to communicate with one of the plurality of controllers at a time; and
- allow the HMI device to switch from one controller to another, among the plurality of controllers;
- wherein the TPU-MUX further comprises:
- an input node to connect the TPU-MUX to the HMI device; and
- a plurality of output nodes to connect the TPU-MUX to the plurality of controllers;
- wherein the plurality of output nodes and the plurality of controllers are connected in 1:1 configuration.

2. The system of claim 1, wherein the instructions when executed cause the processor to allow the HMI device to initially communicate with a default controller connected to the TPU-MUX, in an event when TPU-MUX is switched ON for the first time.

3. The system of claim 1, wherein the instructions when executed cause the processor to:

fetch at least one of: active list of the plurality of controllers connected to the TPU-MUX, event logs from the plurality of controllers, system information and system files, in an event when the TPU-MUX is turned ON or when requested by the HMI device; and share the fetched active list of the plurality of controllers, the event logs, the system information and the system files with the HMI device.

4. The system of claim 1, wherein the instructions when executed cause the processor to share one of controller ID's and system names, of the plurality of controllers, connected to the TPU-MUX, along with event logs with the HMI device.

5. The system of claim 1, wherein the HMI device comprises an interactive User Interface (UI) that displays icons for the plurality of controllers, along with controller ID's and system names, at the same time.

6. The system of claim 5, wherein the displayed icons allow selection of one of the plurality of controllers to control respective robots and monitor the health of the plurality of controllers by evaluating event logs.

7. The system of claim 1, wherein the HMI device further comprises a plurality of switching modules that allow to execute at least one of enable, disable and emergency stop function for any of the plurality of connected controllers.

8. A method for controlling a plurality of robots, the method comprising:

connecting a plurality of controllers to a Human Machine Interface (HMI) device, via a physical Teach Pendant Unit Multiplexer (TPU-MUX), wherein the TPU-MUX further comprises: an input node to connect the TPU-MUX to the HMI device; and a plurality of output nodes to connect the TPU-MUX to the plurality of controllers; and wherein the plurality of output nodes and the plurality of controllers are connected in 1:1 configuration;

allowing the HMI device to communicate with one of the plurality of controllers at time; and allowing the HMI device to switch from one controller to another, among the plurality of controllers.

9. The method of claim 8, further comprises:

fetching at least one of: an active list of the plurality of controllers connected to the TPU-MUX, event logs from the plurality of controllers, system information and system files, in an event when the TPU-MUX is turned ON or when requested by the HMI device; and sharing the fetched active list of the plurality of controllers, the event logs, the system information and the system files with the HMI device.

10. The method of claim 8, further comprises allowing the HMI device to initially communicate with a default controller connected to the TPU-MUX, in an event when TPU-MUX is switched ON for the first time.

11. The method of claim 8, further comprises sharing one of controller ID's and system names, of the plurality of controllers, connected to the TPU-MUX, along with event logs with the HMI device.

12. The method of claim 8, further comprises:

displaying icons for the plurality of controllers, on the HMI device, along with controller ID's and system names, at the same time;

allowing selection of any one of the plurality of controllers for controlling respective robots; and monitoring the health of the plurality of controllers by evaluating event logs.

13. The method of claim 8, further comprising performing at least one of enable, disable and emergency stop functions for any of the plurality of connected controllers by a single command.

* * * * *